S. C. SHAFFNER.
MEANS FOR RECORDING METER READINGS.
APPLICATION FILED JAN. 7, 1908.
906,071.
Patented Dec. 8, 1908.
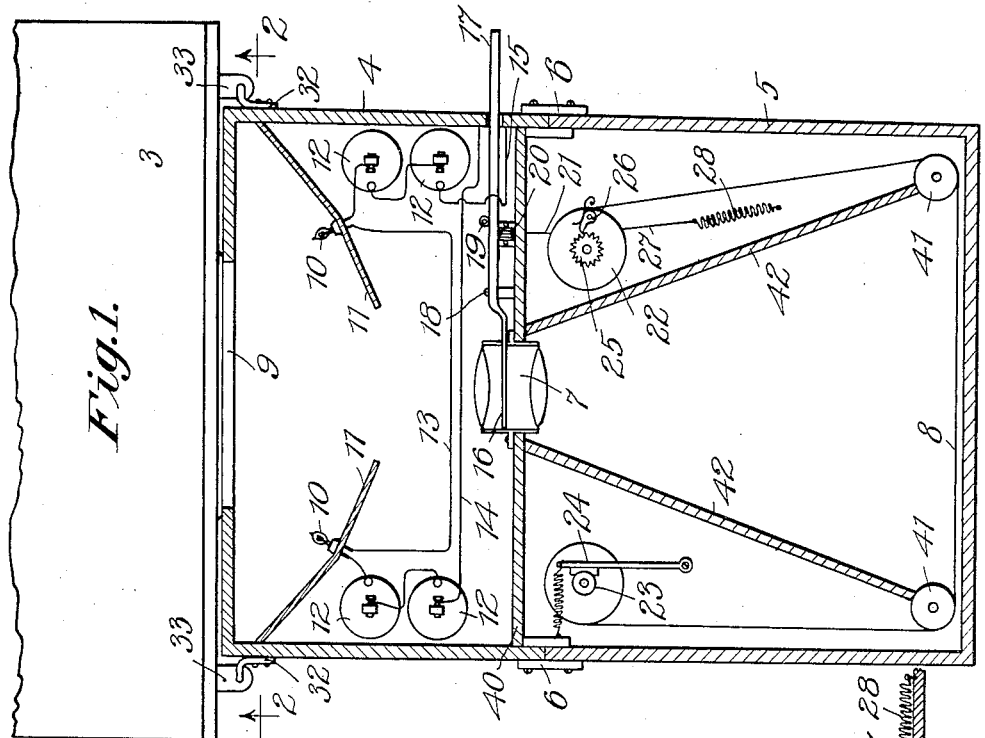
Witnesses:
Geo. C. Higham.
Leonard W. Novander.
Inventor
Samuel C. Shaffner
By Brown & Williams
Attorneys

UNITED STATES PATENT OFFICE.

SAMUEL C. SHAFFNER, OF CHICAGO, ILLINOIS.

MEANS FOR RECORDING METER-READINGS.

No. 906,071.  Specification of Letters Patent.  Patented Dec. 8, 1908.

Application filed January 7, 1908. Serial No. 409,654.

*To all whom it may concern:*

Be it known that I, SAMUEL C. SHAFFNER, a citizen of the United States, residing at Chicago, in the county of Cook and State of Illinois, have invented a certain new and useful Improvement in Means for Recording Meter-Readings, (Case 1,) of which the following is a full, clear, concise, and exact description, reference being had to the accompanying drawings, forming a part of this specification.

My invention relates to an improved means for recording the readings of meters, and consists essentially in associating with a meter, mechanism adapted when operated to make a record photographically of the condition of the meter.

In the past, much dissatisfaction has existed on the part of the users of meters owned by various public service corporations, resulting from the neglect or carelessness of the meter readers, who frequently have omitted to read the meters entirely, and have depended upon averages of previous readings to furnish a basis for report.

My invention is designed to overcome the objections mentioned and to prevent the abuse to which previous systems have been subject.

In carrying out my invention, I associate with the meter photographic apparatus designed to make a record on sensitized paper or film by means of electric light or other illumination, and my invention further contemplates the entire operation of the recording mechanism by a single movement of an operating lever, or handle. That is, the movement of this lever opens the lens shutter and causes the illumination, and by the return of the lever to the starting position sets the apparatus ready for the next record.

The several drawings illustrating my invention are as follows: Figure 1 is a top view showing diagrammatically a meter and mechanism associated therewith in accordance with my invention for producing the results described; Fig. 2 is a vertical sectional view taken along the line 2, 2 in Fig. 1; Fig. 3 is a detail view of the operating lever; Fig. 4 is a detail view of the roller used to receive the exposed film; Fig. 5 is a detail view of a mechanism used to operate the roller shown in Fig. 4.

Similar numerals refer to similar parts throughout the several views.

Referring to the drawings, 3 represents a meter, upon the front of which and at either side of the dial opening are secured lugs 33, into which hooks 32 carried by a casing 4 are adapted to enter. The purpose of these lugs and coöperating hooks is to securely associate the casing 4 and meter 3 in order that the mechanism carried in such casing may properly perform its function. As shown in Fig. 1, the top of the casing is removed and the location of the apparatus contained within the casing is shown diagrammatically. A lens 7 is located about in the middle of the compartment formed by this casing, this lens being supported in place by a central partition 40 and adapted to form an image of the dial of the meter upon a sensitized paper or film 8 supported across the rear end of the inside of the casing 4. This paper or film is adapted to be supported upon a supply roller 23 coöperating with which, as seen, is a brake 24 to prevent the film unwinding from the roller except as it is required in the operation of the device. The paper or film 8 is led around guide-rollers 41, 41, and to a receiving roller 22 located in the other side of the casing 4. Partitions or screens 42, 42 are provided to prevent the light thrown upon the film 8 by the lens 7 from affecting any of such film except that exposed between the guide rollers 41, 41. A shutter 16 pivoted at 18 to the partition 40 and connected to operating lever 17 is provided in order that the lens may be opened or exposed when it is desired to make a record. The portion of the casing in front of the partition 40 contains batteries 12 adapted to light the lamps 10, 10 when circuit from such batteries through such lamps is closed, which is accomplished in the following manner: When the lever 17 is depressed and has removed the shutter 16 from the lens 7, it engages a spring contact 36 shown in Fig. 3 and presses it against a second spring contact 35, as a result of which a circuit is closed as follows, beginning with contact 35: contact 35, wire 15, batteries 12, lamp 10, wire 13, lamp 10, batteries 12, wire 14, contact 36, back to contact 35, as a result of which it is seen that the lighting of the lamps 10 occurs only after the lens has been opened and continues as long as the lever 17 is held against the action of the returning spring 19 in its depressed position. The light from the lamps 10 is thrown by screens 11 through the opening 9 in the front of the casing 4 upon the dial of the meter, and the dial is thus sufficiently illuminated to produce an impression through the lens 7 upon the film 8. The roller 22 carries at its upper end a ratchet wheel 25, as indicated in Fig. 4, adapted to coöperate with a pawl 26 secured to the under side of the top of the casing 4 in such a manner as to prevent back rotation of the roller 22. The roller 22 carries on its lower end a similar ratchet wheel 38 adapted to coöperate with a pawl 39 carried by a drum 37 in such a manner that the drum 37 may be rotated backward relatively to the direction of winding of film upon the roller 22, but when moved in the opposite direction by means to be described, will also cause rotation of such roller 22. The lever 17 is connected by a cord passing over pulley 20, with the drum 37, and a second cord 27 is also attached to this drum 37 and to one end of a spring 28, the other end of which is secured to the bottom of the casing 4, as indicated.

As a result of the construction just described, when the lever 17 is depressed the spring 28 contracts and by means of the cord 27 causes rotation of the drum 37 relatively to the roller 22 and takes up the slack of the cord 21. When the lever 17 is released after the proper length of exposure, the spring 19, which is much stronger than the spring 28, serves to return the lever 17 to its upper position and by means of the cord 21 rotates the drum 37 against the friction of the brake 24 and the action of the spring 28, and rolls the film 8 upon the roller 22, as a result of the positive engagement of the pawl 39 and ratchet wheel 38 which occurs at this time as described. In this way the exposed film is automatically removed from the field covered by the lens 7, and an unexposed portion of the film is moved into place ready for the next record. As described above, the roller 22 is prevented from back rotation, and in this way the film 8 is kept taut between the rollers 41, 41. The rear walls 5 of the casing 4 are adapted to be removable by opening the hooks or catches 6, in order to renew the film when required. I find it desirable to associate the casing 4 with the meter 3 in the manner indicated rather than to inclose the entire meter and recording apparatus in one box or casing, in order to facilitate securing the recording apparatus to a second meter in case the meter to which such recording apparatus is attached needs to be repaired.

As shown in Fig. 2, I may associate with the front end of the casing 4 guideways 31, 31 adapted to receive a card 30 upon which an indication of time may be printed, as the day of the month, and in this connection the meter is preferably equipped with a characteristic or designating number shown at 29, in order that the record may clearly indicate not only the condition of the reading of the meter, but also the day or month during which the record was made, and also the meter number.

While I have shown in this connection a meter having dials and moving hands, it will be understood that my invention is equally applicable to any style of meter and that the means I employ for making a record of the condition or reading of the meter is equally applicable to any means employed for indicating this condition or reading.

While I have shown my invention in the particular embodiment herein described, I do not, however, limit myself to this construction, but claim any equivalent modification that will readily suggest itself to those skilled in the art.

What I claim is:

1. In combination with a meter, a lens and shutter therefor, a medium sensitive to light, an illuminating means, a casing associated with the meter for containing such lens, sensitive medium and illuminating means, coöperating means carried by the meter and casing for locating the casing in place and a member adapted when operated to open the shutter and operate such illuminating means.

2. In combination with a meter, a lens and shutter therefor, a medium sensitive to light, an illuminating means, a casing associated with the meter for containing such lens, sensitive medium and illuminating means, coöperating means carried by the meter and casing for locating the casing in place and a member adapted when operated to open the shutter, operate such illuminating means and advance such sensitive medium to a proper position for the next record.

3. In combination with a meter, a lens and shutter therefor, a medium sensitive to light, an illuminating means, a casing associated with the meter for containing such lens, sensitive medium and illuminating means, coöperating means carried by the meter and casing for locating the casing in place and a lever adapted when depressed to open the shutter and operate such illuminating means and adapted when returned to its normal position to advance such sensitive medium to a proper position for the next record.

4. In combination with a meter, a lens and shutter therefor, a medium sensitive to light, an illuminating means, a casing associated with the meter for protecting such sensitive medium from light except as admitted through such lens, such casing adapted to support such lens and such illuminating means, coöperating means carried by the meter and casing for locating the casing in place and a member adapted when operated to open the shutter and operate such illuminating means.

5. In combination with a meter, a lens and shutter therefor, a medium sensitive to light, an illuminating means, a casing associated with the meter for protecting such sensitive medium from light except as admitted through such lens, such casing adapted to support such lens and such illuminating means, coöperating means carried by the meter and casing for locating the casing in place and a member adapted when operated to open the shutter, operate such illuminating means and advance such sensitive medium to a proper position for the next record.

6. In combination with a meter, a lens and shutter therefor, a medium sensitive to light, an illuminating means, a casing associated with the meter for protecting such sensitive medium from light except as admitted through such lens, such casing adapted to support such illuminating means, coöperating means carried by the meter and casing for locating the casing in place and a lever adapted when depressed to open the shutter and operate such illuminating means and adapted when returned to its normal position to advance such sensitive medium to a proper position for the next record.

7. As a means for recording the condition of a meter, a casing associated with such meter, a lens and shutter carried by such casing, sensitive film within such casing and protected thereby from the action of light except that entering through the lens, an illuminating means supported by such casing, coöperating means carried by the meter and casing for locating the casing in place and a member adapted when operated to open the shutter and operate such illuminating means.

8. As a means for recording the condition of a meter, a casing associated with such meter, a lens and shutter carried by such casing, sensitive film within such casing and protected thereby from the action of light except that entering through the lens, an illuminating means supported by such casing, coöperating means carried by the meter and casing for locating the casing in place and a lever adapted when depressed to open the shutter and operate such illuminating means and adapted when returned to its normal position to advance such film to a proper position for the next record.

9. In combination with a meter, a lens and shutter therefor, a medium sensitive to light, an electric lamp and a source of electric energy for lighting such lamp, a casing associated with the meter for containing such lens, sensitive medium and lamp, coöperating means carried by the meter and casing for locating the casing in place and a member adapted when operated to open the shutter and close a circuit from such source of electric energy through such lamp.

10. In combination with a meter, a lens and shutter therefor, a medium sensitive to light, an electric lamp and a source of electric energy for lighting such lamp, a casing associated with the meter for containing such lens, sensitive medium and lamp, coöperating means carried by the meter and casing for locating the casing in place and a member adapted when operated to open the shutter, close a circuit from such source of electric energy through such lamp and advance such sensitive medium to a proper position for the next record.

11. In combination with a meter, a lens and shutter therefor, a medium sensitive to light, an electric lamp and a source of electric energy for lighting such lamp, a casing associated with the meter for containing such lens, sensitive medium and lamp, coöperating means carried by the meter and casing for locating the casing in place and a lever adapted when depressed to open the shutter and close a circuit from such source of electric energy through such lamp and adapted when returned to its normal position to open such circuit and advance such sensitive medium to a proper position for the next record.

12. In combination with a meter, a lens and shutter therefor, a medium sensitive to light, an electric lamp and a source of electric energy for lighting such lamp, a casing associated with the meter for protecting such sensitive medium from light except as admitted through such lens, such casing adapted to support such lens and such lamp, coöperating means carried by the meter and casing for locating the casing in place and a member adapted when operated to open the shutter and close a circuit from such source of electric energy through such lamp.

13. In combination with a meter, a lens and shutter therefor, a medium sensitive to light, an electric lamp and a source of electric energy for lighting such lamp, a casing associated with the meter for protecting such sensitive medium from light except as admitted through such lens, such casing adapted to support such lens and such lamp, coöperating means carried by the meter and casing for locating the casing in place and a member adapted when operated to open the shutter and close a circuit from such source of electric energy through such lamp and advance such sensitive medium to a proper position for the next record.

14. In combination with a meter, a lens and shutter therefor, a medium sensitive to light, an electric lamp and a source of electric energy for lighting such lamp, a casing associated with the meter for protecting such sensitive medium from light except as admitted through such lens, such casing adapted to support such lens and such lamp, coöperating means carried by the meter and casing for locating the casing in place and a lever adapted when depressed to open the shutter and close a circuit from such source of electric energy through such lamp and adapted when returned to its normal position to open such circuit and advance such sensitive medium to a proper position for the next record.

15. As a means for recording the condition of a meter, a casing associated with such meter, a lens and shutter carried by such casing, sensitive film within such casing and protected thereby from the action of light except that entering through the lens, an electric lamp supported by such casing, a source of electric energy for lighting such lamp, coöperating means carried by the meter and casing for locating the casing in place and a member adapted when operated to open the shutter and close a circuit from such source of electric energy through such lamp.

16. As a means for recording the condition of a meter, a casing associated with such meter, a lens and shutter carried by such casing, sensitive film within such casing and protected thereby from the action of light except that entering through the lens, an electric lamp supported by such casing, a source of electric energy for lighting such lamp, coöperating means carried by the meter and casing for locating the casing in place and a lever adapted when depressed to open the shutter and close a circuit from such source of electric energy through such lamp and adapted when returned to its normal position to open such circuit and advance such sensitive medium to a proper position for the next record.

17. As a means for recording the condition of a meter, a casing associated with such meter, a lens and shutter carried by such casing, sensitive film within such casing and protected thereby from the action of light except that entering through the lens, an electric lamp supported by such casing, a battery carried by such casing and adapted to light such lamp, coöperating means carried by the meter and casing for locating the casing in place and a member adapted when operated to open the shutter and close a circuit from such battery through such lamp.

18. As a means for recording the condition of a meter, a casing associated with such meter, a lens and shutter carried by such casing, sensitive film within such casing and protected thereby from the action of light except that entering through the lens, an electric lamp supported by such casing, a battery carried by such casing and adapted to light such lamp, coöperating means carried by the meter and casing for locating the casing in place and a lever adapted when depressed to open the shutter and close a circuit from such battery through such lamp and adapted when returned to its normal position to open such circuit and advance such film to a proper position for the next record.

19. In combination with a meter, a lens and shutter therefor, a medium sensitive to light, an illuminating means, a casing for containing such lens, sensitive medium and illuminating means, a member adapted when operated to open the shutter and operate such illuminating means, and means associated with the meter and casing for alining the lens relatively to the meter indications.

20. In combination with a meter, a lens and shutter therefor, a medium sensitive to light, an illuminating means, a casing for containing such lens, sensitive medium and illuminating means, a member adapted when operated to open the shutter, operate such illuminating means and advance such sensitive medium to a proper position for the next record, and means associated with the meter and casing for alining the lens relatively to the meter indications.

21. In combination with a meter, a lens and shutter therefor, a medium sensitve to light, an illuminating means, a casing for containing such lens, sensitive medium and illuminating means, a lever adapted when depressed to open the shutter and operate such illuminating means and adapted when returned to its normal position to advance such sensitive medium to a proper position for the next record, and means associated with the meter and casing for alining the lens relative to the meter indications.

22. In combination with a meter, a lens and shutter therefor, a medium sensitive to light, an illuminating means, a casing for protecting such sensitive medium from light except as admitted through such lens, such casing adapted to support such lens and such illuminating means, a member adapted when operated to open the shutter and operate such illuminating means, and means associated with the meter and casing for alining the lens relatively to the meter indications.

23. As a means for recording the condition of a meter, a casing adapted to coöperate with such meter, a lens and shutter carried by such casing, sensitive film within such casing and protected thereby from the action of light except that entering through the lens, an illuminating means supported by such casing, a member adapted when operated to open the shutter and operate such illuminating means, and means associated with the meter and casing for alining the lens relatively to the meter indications.

24. As a means for recording the condition of a meter, a casing adapted to coöperate with such meter, a lens and shutter carried by such casing, sensitive film within such casing and protected thereby from the action of light except that entering through the lens, an illuminating means supported by such casing, a lever adapted when depressed to open the shutter and operate such illuminating means and adapted when returned to its normal position to advance such film to a proper position for the next record, and means associated with the meter and casing for alining the lens relatively to the meter indications.

25. As a means for recording the condition of a meter, a casing adapted to coöperate with such meter, a lens and shutter carried by such casing, sensitive film within such casing and protected thereby from the action of light except that entering through the lens, an electric lamp supported by such casing, a battery carried by such casing and adapted to light such lamp, a member adapted when operated to open the shutter and close a circuit from such battery through such lamp, and means associated with the meter and casing for alining the lens relatively to the meter indications.

26. As a means for recording the condition of a meter, a casing adapted to coöperate with such meter, a lens and shutter carried by such casing, sensitive film within such casing and protected thereby from the action of light except that entering through the lens, an electric lamp supported by such casing, a battery carried by such casing and adapted to light such lamp, a lever adapted when depressed to open the shutter and close a circuit from such battery through such lamp and adapted when returned to its normal position to open such circuit and advance such film to a proper position for the next record, and means associated with the meter and casing for alining the lens relatively to the meter indications.

In witness whereof, I hereunto subscribe my name this 31st day of December, A. D., 1907.

SAMUEL C. SHAFFNER.

Witnesses:
 LEONARD W. NOVANDER,
 ALBERT C. BELL.